Patented Apr. 13, 1926.

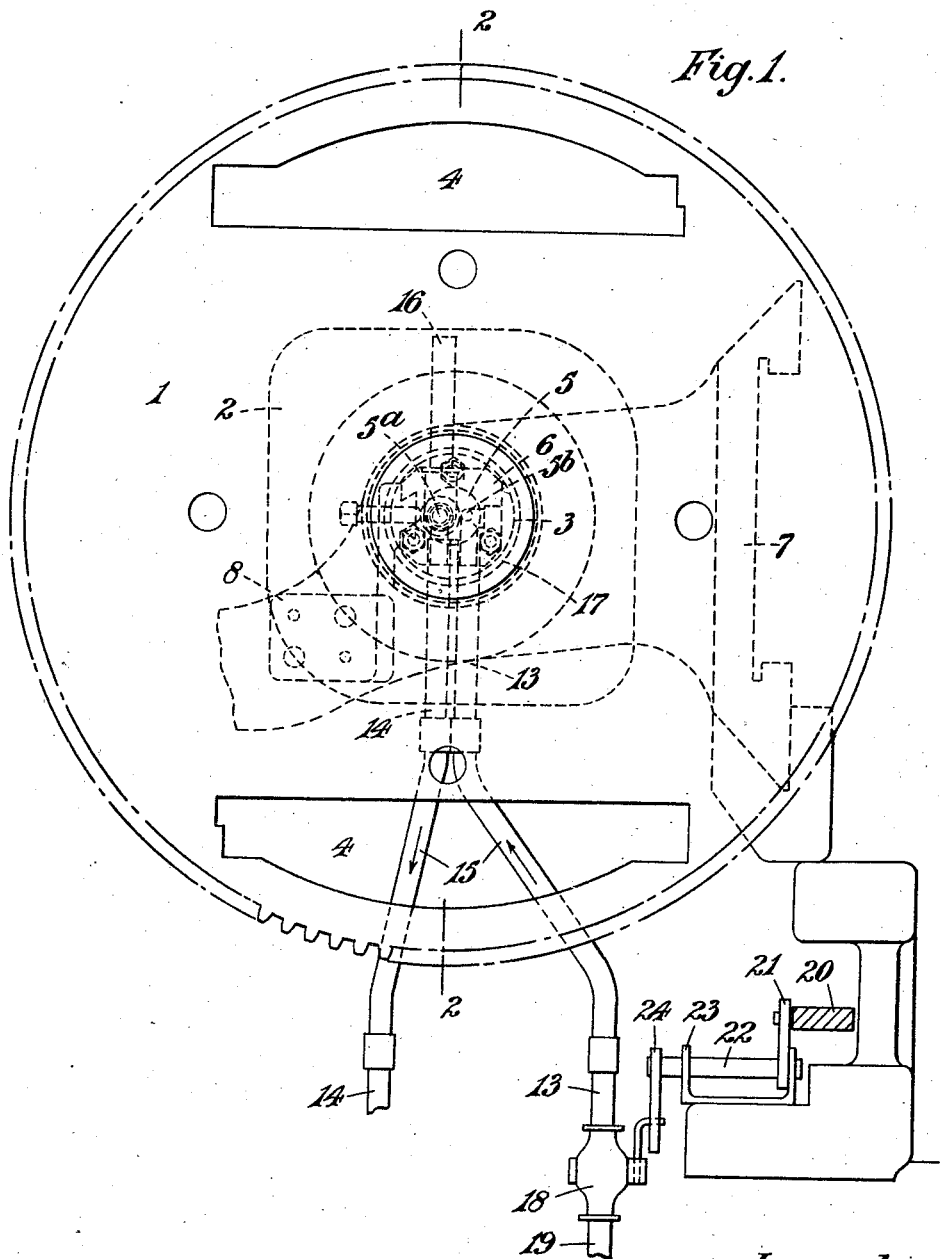

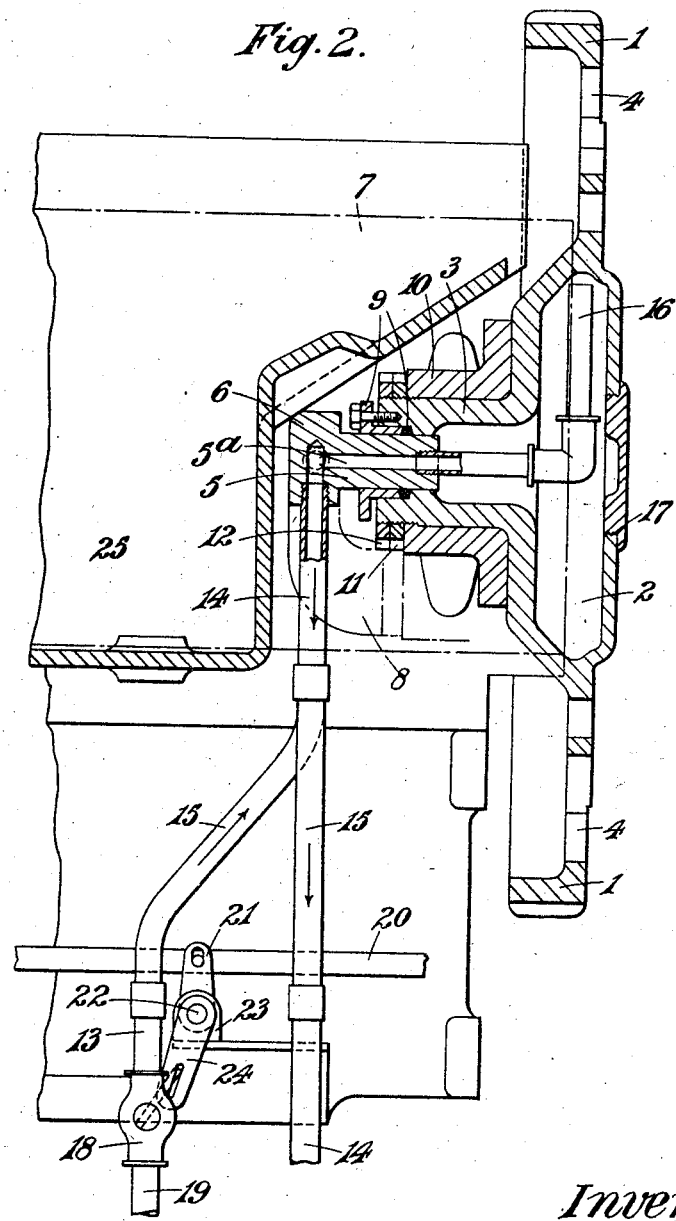

1,580,133

UNITED STATES PATENT OFFICE.

BENJAMIN JOSEPH JOHN GOULDING AND THOMAS ROBERT GILLETT PARKER, OF ALTRINCHAM, ENGLAND, ASSIGNORS TO LINOTYPE AND MACHINERY LIMITED, OF LONDON, ENGLAND.

APPARATUS FOR COOLING THE MOLDS OF TYPOGRAPHICAL CASTING MACHINES.

Application filed September 7, 1923. Serial No. 661,387.

*To all whom it may concern:*

Be it known that we, BENJAMIN JOSEPH JOHN GOULDING and THOMAS ROBERT GILLETT PARKER, both subjects of the King of the United Kingdom of Great Britain and Ireland, and residing at Linotype and Machinery Works, Altrincham, in the county of Chester, England, have invented new and useful Improvements in or Relating to Apparatus for Cooling the Molds of Typographical Casting Machines, of which the following is a specification.

This invention relates to apparatus for cooling the molds of typographical casting machines such as those known commercially under the trade mark "Linotype" and it has for a chief object so to construct said apparatus as to render it more efficient than have been those heretofore available for the purpose.

In such apparatus as hitherto employed, much difficulty has been experienced through the cooling water gaining access to the bearing in which the shaft or spindle of the mold wheel rotates, and one of the principal benefits arising out of the present invention is the prevention of such access of water to the said bearing. A further object of the invention is to provide means for enabling the water supply to be readily controlled from the front of the machine, so that if and when the operator requires temporarily to stop the machine, the water supply can be cut off and the cooling effect on the mold discontinued, with the result that an early resumption of working of the machine will still find said mold at a temperature suitable for satisfactory casting, without having then to resort to the usual practice of bringing the mold to the necessary temperature by casting a number of imperfect slugs, as has heretofore been necessary in machines wherein the water supply has not been so cut off.

The invention will now be described by reference to the accompanying drawings which represent a preferred constructional form thereof, and in which:—

Figure 1 is a front elevation of one constructional form of said invention, and

Figure 2 is a vertical section taken generally on the line 2—2 of Figure 1 and showing part of the metal pot jacket in section.

In the constructional form here illustrated, the mold wheel 1, as in certain other existing arrangements, is provided with a central water chamber 2, but in the present arrangement, as distinguished from the earlier ones, the mold wheel has its shaft or spindle 3 cast as an integral part thereof said shaft being hollow or tubular with its interior as it were, forming a rearward extension of the water chamber 2, all as shown best in Figure 2.

The water chamber 2 is itself, of such capacity as to enable the maximum volume of water to be contained therein; for this purpose, as shown best in Figure 1, it may be of approximately rectangular or polygonal form with its sides extending parallel with the mold slots. As the molds constitute no part of the present invention, they have been omitted from the drawings, although two mold wheel slots 4 are shown in the mold wheel 1, into each of which a separate mold may be fitted in the well-known manner.

For convenience of description the side of the mold wheel farthest away from the operator, that is to say, that side at which the hollow shaft is located, is herein regarded as the rear.

The rear end of the hollow shaft 3 is open, although preferably of smaller diameter than is the more forward part of said shaft, and into this end projects a cylindrical stud or nozzle 5, whose head or rear end 6 is detachably secured to a bracket arm 8 itself in rigid connection with the mold-wheel slide 7. The rotating mold wheel 1 and the non-rotating stud 5 are maintained in mutual water-tight contact by a gland and stuffing box 9 provided in or on the hollow shaft 3.

The hollow shaft 3 itself is rotatably supported in a bearing 10 rigidly secured to, or integral with, the mold-wheel slide 7, and it is secured against axial movement therein, by the abutment against the front and rear ends of the bearing, of respectively, the rear wall of the water chamber 2 and a nut 11 threaded on the rear end of said shaft, a second nut 12 being similarly provided on the shaft to act as a lock nut.

The stud 5 is provided with two independent passages 5ª and 5ᵇ both shown in dotted lines in Figure 1 and the former shown in section in Figure 2. These passages lead from the extreme front end of the stud 5 to the underside of the head 6 where, through two pipes 13, 14 and flexible tubing 15, they are connected, one (5$^b$ the inlet) with the source of water supply, and the other (5$^a$ the outlet) with a waste pipe. The front end of the outlet passage 5$^a$ has secured to it, in water-tight connection therewith, a pipe 16 whose open end is located close to the top of the water chamber 2 so as to secure the widest possible distribution of cooling water; a plugged opening 17 is provided in the front of the water chamber 2 to enable the above-named connection of the pipe 16 to the outlet passage 5$^a$, to be effected.

Any necessary axial adjustment of the mold wheel 1 relatively to the mold-wheel slide 7 (such as might be occasioned by wear) can be effected by turning the nuts 11, 12 on the hollow shaft 3, and will not involve, as has heretofore been necessary when effecting similar adjustments in existing arrangements, the opening of the water chamber, and the consequential breakage and remaking of the necessary water-tight joints.

In one convenient arrangement for enabling the water supply to be controlled from the front of the machine, a cock 18 which is provided in the stationary supply pipe 19 with which the before described inlet pipe 5$^b$, is connected through the respective flexible tubing 15, is operatively connected with some part of the mechanism whose actuation is involved in the starting and stopping of said machine. For instance, as shown in the accompanying drawings, it may be connected with the so-called starting-handle rod 20 which, as is well known, is present in all machines of the type under consideration. In such an arrangement, the said rod 20 is in pin-and-slot connection with a lever arm 21 fast to a shaft 22 capable of rocking in a stationary bracket 23, a second lever arm 24 on said shaft 22 being in pin-and-slot connection with the plug of the cock 18, so that when the rod 20 is moved in the direction for starting the machine, the cock will be automatically opened, and when it is moved in the other direction for stopping the machine, said cock will be automatically closed.

In another arrangement which, however, does not secure the just-mentioned automatic control, but which, nevertheless, permits of control by the operator from the front of the machine, the cock is conveniently within reach of the operator to enable him to readily open and close it without necessitating his walking to the back of the machine, or, even with the cock located in the same position as that indicated in the drawings, it could still be correspondingly controlled by the operator by means of a forwardly and backwardly movable rod in pin-and-slot connection with the plug of said cock.

With any of the last-mentioned operator-controlled devices there may be provided a suitable "on" and "off" indicator which will show at a glance, whether the cock is open or closed.

The before mentioned metal pot jacket is identified by the reference numeral 25 in Figure 2.

Having described our invention, we declare that what we claim and desire to secure by Letters Patent is:—

1. In a typographical casting machine, the combination of a rotatable mold wheel formed with a hollow central portion presenting an internal water chamber and provided with a hollow or tubular shaft or spindle in direct open communication with the water chamber, a fixed bearing sleeve in which the wheel shaft or spindle is mounted to turn, and a stud or nozzle fitted water-tight in the wheel shaft or spindle to close the water chamber.

2. In a typographical casting machine, the combination of a rotatable mold wheel formed with a hollow central portion presenting an internal water chamber and provided with a hollow or tubular shaft or spindle in direct open communication with the water chamber, a fixed bearing sleeve in which the wheel shaft or spindle is mounted to turn, and a fixed stud or nozzle fitted water-tight in the wheel shaft or spindle to close the water chamber.

3. In a typographical casting machine, the combination of a rotatable mold wheel formed with a hollow central portion presenting an internal water chamber and provided with a hollow or tubular shaft or spindle in direct open communication with the water chamber, a fixed bearing sleeve in which the wheel shaft or spindle is mounted to turn, and a fixed stud or nozzle fitted water-tight in the wheel shaft or spindle to close the water chamber, the said stud or nozzle being formed with separate passages leading to and from the water chamber, respectively, to provide for the circulation of water therethrough.

4. In a typographical casting machine, the combination of a rotatable mold wheel formed with a hollow central portion presenting an internal water chamber and provided with a hollow or tubular shaft or spindle in direct open communication with the water chamber, a fixed bearing sleeve in which the wheel shaft or spindle is mounted to turn, a fixed cylindrical stud or nozzle arranged within the wheel shaft or spindle and formed with inlet and outlet passages leading to and from the water chamber, and a water-tight joint between the fixed stud or nozzle and the wheel shaft or spindle enabling the latter to turn on the former without leakage of water between them.

5. In a typographical casting machine, the combination of a rotatable mold wheel formed with a hollow central portion presenting an internal water chamber and provided with a hollow or tubular shaft or spindle in direct open communication with the water chamber, a fixed bearing sleeve in which the wheel shaft or spindle is mounted to turn, a fixed stud or nozzle fitted water-tight in the wheel shaft or spindle to close the water chamber and formed with inlet and outlet passages leading to and from the chamber, and an upwardly extending pipe in water-tight communication with the outlet passage and whose open end is located close to the top of the water chamber.

6. In apparatus for cooling the molds of a typographical casting machine, the combination with a rotatable mold wheel, a central water chamber in said wheel and a hollow or tubular shaft or spindle integral with the wheel in open communication with the interior of the chamber, of a cylindrical stud or nozzle entering the rear end of the hollow shaft, in water-tight connection with the latter, inlet and outlet passages through the nozzle in open communication with the water chamber and with respectively the water supply and waste the inlet passage opening directly into the water chamber and an upwardly extending pipe in water-tight connection with the outlet passage through the nozzle and whose open end is located close to the top of the water chamber.

7. In apparatus for cooling the molds of a typographical casting machine, the combination with a rotatable mold wheel, a central water chamber in said wheel and a hollow or tubular shaft or spindle integral with the wheel in open communication with the interior of the chamber, of a cylindrical stud or nozzle entering the rear end of the hollow shaft, a mold wheel slide adapted to carry the mold wheel, a bearing on the mold wheel slide within which the hollow shaft is rotatable and a nut threaded on said shaft for axially adjusting this shaft in the bearing.

8. Apparatus for cooling the molds of a typographical casting machine having a rotatable mold wheel provided with a central water chamber, characterized by the fact that the chamber is of approximately rectangular or polygonal form with its straight sides parallel with the mold slots.

9. In apparatus for cooling the molds of a typographical casting machine, the combination with a rotatable mold wheel, a central water chamber in said wheel, and a hollow or tubular shaft or spindle integral with the wheel in open communication with the interior of the chamber, of a cylindrical stud or nozzle entering the rear end of the hollow shaft, in water-tight connection with the latter, inlet and outlet passages through the nozzle in open communication with the water chamber and with respectively the water supply and waste, a cock in the water supply pipe, and controlling means for the cock readily operative from the front of the machine.

10. In apparatus for cooling the molds of a typographical casting machine, the combination with a rotatable mold wheel, a central water chamber in said wheel, and a hollow or tubular shaft or spindle integral with the wheel in open communication with the interior of the chamber, of a cylindrical stud or nozzle entering the rear end of the hollow shaft, in water-tight connection with the latter, inlet and outlet passages through the nozzle in open communication with the water chamber and with respectively the water supply and waste, a cock in the water supply pipe, devices normally involved in the starting and stopping of the machine, and controlling means for the cock operatively connected with the said devices so that when the latter are operated to start and stop the machine, the cock will respectively be opened and closed.

11. In apparatus for cooling the molds of a typographical casting machine, the combination with a rotatable mold wheel, a central water chamber in said wheel, and a hollow or tubular shaft or spindle integral with the wheel in open communication with the interior of the chamber, of a cylindrical stud or nozzle entering the rear end of the hollow shaft, in water-tight connection with the latter, inlet and outlet passages through the nozzle in open communication with the water chamber and with respectively the water supply and waste, a cock in the water supply pipe, a starting handle rod operated for starting and stopping the machine, and means operatively connecting said rod with the cock so that when the former is operated for starting and stopping the machine, the cock is respectively opened and closed.

12. In a typographical casting machine, the combination of a rotatable mold wheel, a water cooling system associated therewith, and automatic means for shutting off the water supply when the machine is thrown out of operation.

13. In a typographical casting machine, the combination of a rotatable mold wheel, a water cooling system associated therewith, and automatic means for turning on and shutting off the water supply when the machine is thrown into and out of operation, respectively.

14. In a typographical casting machine, the combination of a rotatable mold wheel, a water cooling system associated therewith, devices normally involved in the starting and stopping of the machine, and means actuated by said devices for turning on and shutting off the water supply.

15. In a typographical casting machine, the combination of a rotatable mold wheel formed with a hollow central portion presenting an internal water chamber, a hollow or tubular shaft or spindle made integral with the wheel and in direct open communication with the water chamber, a fixed bearing sleeve in which the wheel shaft or spindle is mounted to turn, and a fixed stud or nozzle fitted water-tight in the rear end of the wheel shaft or spindle to close the water chamber, the said stud or nozzle being formed with separate passages leading to and from the water chamber, respectively, to provide for the circulation of the water therethrough.

In testimony whereof we have affixed our signatures hereto.

BENJAMIN JOSEPH JOHN GOULDING.
THOMAS ROBERT GILLETT PARKER.